United States Patent

[11] 3,602,806

| [72] | Inventor | Jan A. Czekajewski<br>1793 Northwest Boulevard, Columbus, Ohio 43212 |
|---|---|---|
| [21] | Appl. No. | 798,689 |
| [22] | Filed | Feb. 12, 1969 |
| [45] | Patented | Aug. 31, 1971 |

[54] SELECTIVE ACTIVITY METER FOR LABORATORY ANIMALS
9 Claims, 10 Drawing Figs.

| [52] | U.S. Cl. | 324/40, 340/279 |
|---|---|---|
| [51] | Int. Cl. | G01r 33/14, G08b 21/00 |
| [50] | Field of Search | 324/40, 41, 34; 340/258 C, 279; 128/2.08 |

[56] References Cited
UNITED STATES PATENTS

| 3,201,774 | 8/1965 | Uemura | 340/258 |
| 3,444,460 | 5/1969 | Penney | 324/40 |
| 3,381,217 | 4/1968 | Williamson et al. | 324/41 |

Primary Examiner—Alfred E. Smith
Attorney—Anthony D. Cennamo

ABSTRACT: A system for obtaining information concerning the activity of animate specimens and a quantitative measurement of many varieties of motions. Specifically, the invention comprises a plurality of inductive coils in a resonant circuit configuration utilizing variations in the "Q" of the circuit to provide an output.

PATENTED AUG 31 1971 3,602,806

INVENTOR.
JAN A. CZEKAJEWSKI

BY
ATTORNEY

INVENTOR.
JAN A. CZEKAJEWSKI

INVENTOR.
JAN A. CZEKAJEWSKI 3,602,806

SELECTIVE ACTIVITY METER FOR LABORATORY ANIMALS

BACKGROUND

In the fields of biology, medicine, psychology, and especially within pharmacological research there is a need for objective, quantitative measurements of the activity of experimental animals, such as rats, mice, hamsters, etc. In the prior art measurements could not be made over an extended period of time due to the eating habits of the specimens. Underlay, food, urine, and excrement all had an adverse influence on the test means.

Often in the past test means required the controlling of the ambient light conditions. This requirement had the adverse effect of influencing the activity of the specimens in some situations.

Some animals respond differently when isolated from other animals of the same species. Therefore, to obtain an actual measurement of one specimen's activity as related to other similar animals the test means must have the capability of selectively monitoring a chosen specimen. This capability was not available in the prior art.

In prior art measurement systems the test measurements were based on only absolute values. This means that if one specimen were to remain on the test system's sensing element there would result a blocking effect on the system's response. There has existed a great need for a measurement device that does not have the above-mentioned shortcomings.

SUMMARY

The present invention relates to a means for detecting the change of "Q" in an inductive coil when a nonideal dielectric or semiconducting material object approaches the coil. The "Q" sensor comprises a unique configuration of sensing coils in a resonant circuit. The magnetic field associated with the coils induces electric currents in the object which in turn are converted to heat and represent loss of electromagnetic energy. The inductive coupling results in a drop in the "Q" of the coil. The associated change in current in the resonant circuit triggers a registering device which shows quantitatively the motion of the object relative to the sensor coils.

The sensitivity of the system can be varied, thereby permitting the monitoring of a single animal or a group of animals. The selective and statistical monitoring capability is very useful in scientific testing. The cages in which the animals are maintained may be any size and may be constructed of any material (provided the cage bottom is nonconductive).

Due to the fact that magnetic flux is utilized as the coupling medium the system is not influenced by the pressure of underlay, food, urine, or excrement on the cage bottom. Also there is no necessity that the ambient light be controlled, therefore, measurements may be made under conditions which simulate night conditions.

The system measures changes in flux coupling and not absolute values. This permits one animal to be on the sensor element while at the same time the system will indicate the movement of a nearby animal. The unit, therefore, has a block-safe capability.

The system may be used to study motor responses, motor activity of newborn infants, a person's activity while asleep and dreaming, for alarm purposes and for other industrial applications.

OBJECTS

Accordingly, it is a principal object of the invention to provide an improved proximity sensor.

Another object of the invention is to provide a proximity sensor which permits selective monitoring of one or a group of animal specimens.

Another object of the invention is to provide a proximity sensor which is not influenced by underlay, food, urine, or excrement.

Another object of the invention is to provide a proximity sensor which is block-safe.

Another object of the invention is to provide a proximity sensor which is not influenced by ambient light.

A further object of the invention is to provide a proximity sensor which permits quantitive measurements with a variety of indication means, for example, electronic and electromechanical counters and printers.

Still a further object of the invention is to provide a proximity sensor which permits an indication of motion of any nonideal dielectric material.

For a complete understanding of the invention, together with other objects and advantages thereof, reference may be made to the accompanying drawings, in which:

DESCRIPTION OF THE PREFERRED EMBODIMENT

Figure 1:
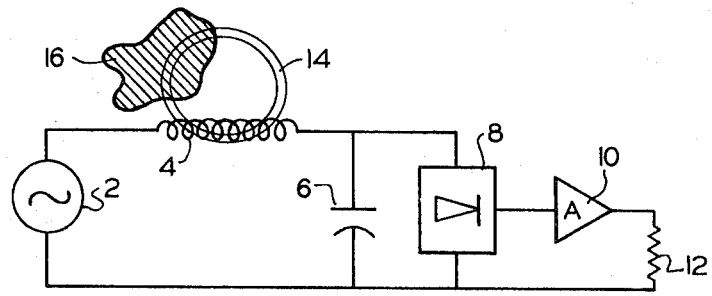
FIG. 1 is a schematic representation of the basic circuit of the preferred embodiment.

Referring now to FIG. 1 there is illustrated the basic circuit of the preferred embodiment of the invention. The circuit comprises an alternating current source 2 of voltage with a low internal impedance, an inductance 4, a capacitance 6, a detector 8, an amplifier 10, and a utilization means 12.

Figure 2:
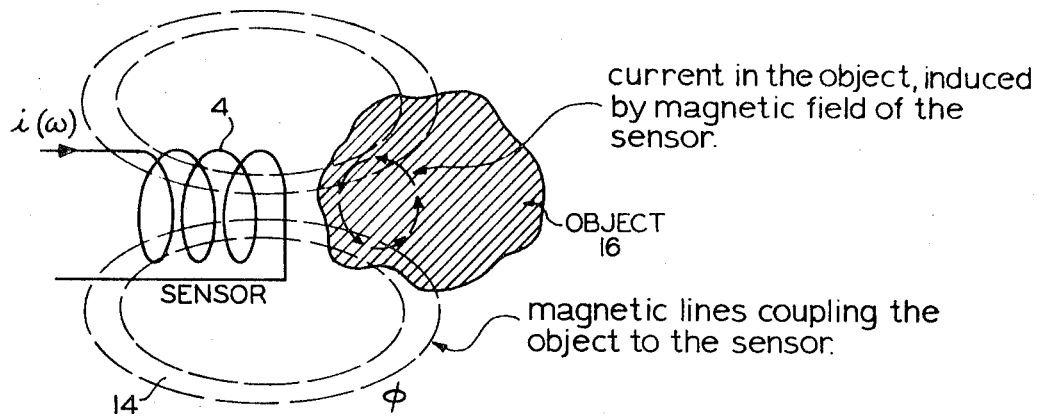
FIG. 2 is a diagrammatic representation of the magnetic field surrounding the coil shown in the preferred embodiment.

The basic element of the preferred embodiment is the inductive coil 4 through which the alternating current flows. The alternating current creates a magnetic field 14 around the coil 4, as shown in FIG. 2. The magnetic field 14 is the medium which couples the preferred embodiment to the objects 16 which come physically close to the coil 4.

When an object 16 which is not an ideal dielectric approaches the coil 4 a portion of the magnetic field 14 passes through the object 16 and, thereby, induces electric currents to flow in the object 16. These currents are converted to heat and other forms of energy which are dissipated. This dissipated energy represents a loss of electromagnetic energy.

Figure 3:
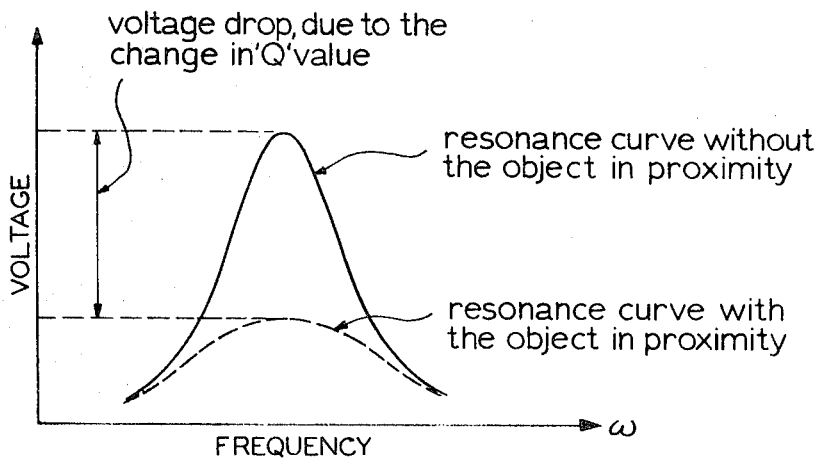
FIG. 3 is a graphical representation of the voltage across the coil of the preferred embodiment as a function of the frequency of the current exciting the coil.

The "Q" of a coil is a quality factor rating which is applied to a coil or resonant circuit. Q is generally defined as the inductive reactance divided by the resistance. The voltage across a coil is, therefore, directly related to the Q value of the coil. FIG. 3 shows in a graphical representation the voltage across a coil as a function of the frequency of the current exciting the coil.

The Q value of a coil is usually relatively high. When the object 16 is placed in the field 14 of the coil 4 there is a drop in the value of the Q of the coil 4. Due to the fact that the object 16 and the coil 4 are inductively coupled, the induced voltages and, therefore, the currents and losses are proportional to the frequency of operation of the source 2. By utilizing this characteristic the sensitivity of the preferred embodiment can be varied. That is, if the frequency is low the sensitivity will be low and if the frequency is high the sensitivity will be high.

Figure 4:
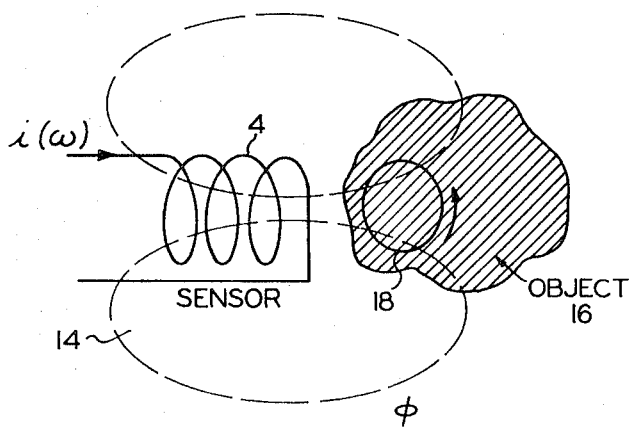
FIG. 4 is a diagrammatic illustration of a conductive loop in the field surrounding the coil.

This variation in sensitivity may be used for selective sensing of objects. When it is desired that the preferred embodiment be capable of distinguishing some objects from other similar objects, the frequency of the source is lowered to the point that the preferred embodiment is insensitive to any of the objects (i.e., the objects do not produce a sufficient change in the Q value of the coil to permit an output). There is then attached to the particular objects 16 whose activity it is desired to monitor, a thin closed loop of wire 28 (see FIG. 4). This wire 18 represents a much higher coupling to the preferred embodiment's coil 4 than the remainder of the object 16. The Q of the coil 4 will, therefore, be affected sufficiently to produce an output.

The use of a thin closed loop of wire is just one example of a means to make a particular object more susceptable to detection by the system. Any conductive material can be substituted for the loop. It is only required that the material provide a path for currents which are induced by the coils of the system.

Again referring to FIG. 1, the inductance 4 and the capacitance 6 form a resonant circuit which is tuned to approximately the frequency of the source 2. The voltage which develops across the capacitance 6 (or inductance 4) is equal to the product of the voltage of the source 2 and the Q value of the resonant circuit. The parameter Q is usually high (on the order of 50–300). Any variation of the Q value will produce a corresponding proportional variation in voltage across the resonant circuit elements of the circuit. Any object having even a residual conductance close to the coil will change the coil's Q value.

The detector 8 shown in FIG. 1 detects the variation in the voltage across the capacitance 6 or the inductance 4. This variation is then amplified 10 and the output of the amplifier controls the utilization means 12. The utilization means 12 may be, among others, an electromechanical counter, a printer, a time interval recorder, a cumulative interval printer for registering time varying motion rates, or an electronic counter.

Figure 5:
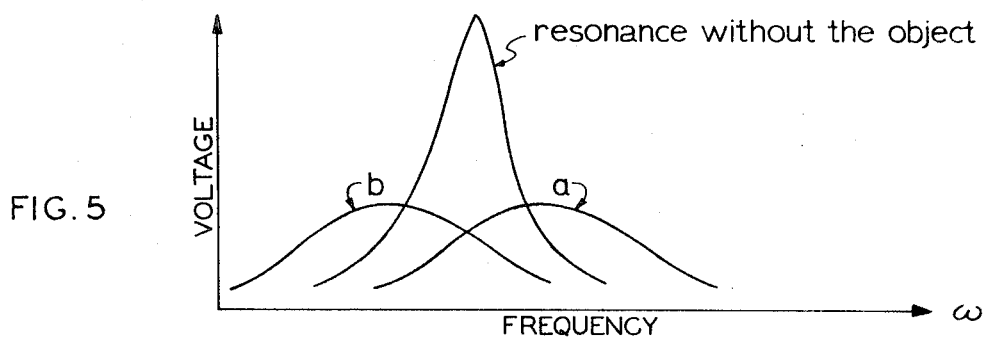
FIG. 5 is a graphical illustration of the effect of capacitance and inductance on the frequency of the resonant circuit of the preferred embodiment.

In practice when an object approaches the coil it will introduce, in addition to the inductive coupling, some capacitive coupling. This capacitive coupling can also change the resonant frequency of the inductance-capacitance circuit. This phenomena is illustrated in FIG. 5 by curves $a$ and $b$, respectively.

The preferred embodiment has been described to this point as comprising a single coil 4. In the application of the invention it would be desirable to have a plurality of discrete sensitive points. This configuration permits a more complete coverage of the area to be monitored and furnishes a representative summary of the activity at all points in the monitored area. In the event the invention were to be used to measure the activity of laboratory animals a plurality of coils would be necessary to provide accurate results.

Figure 6:
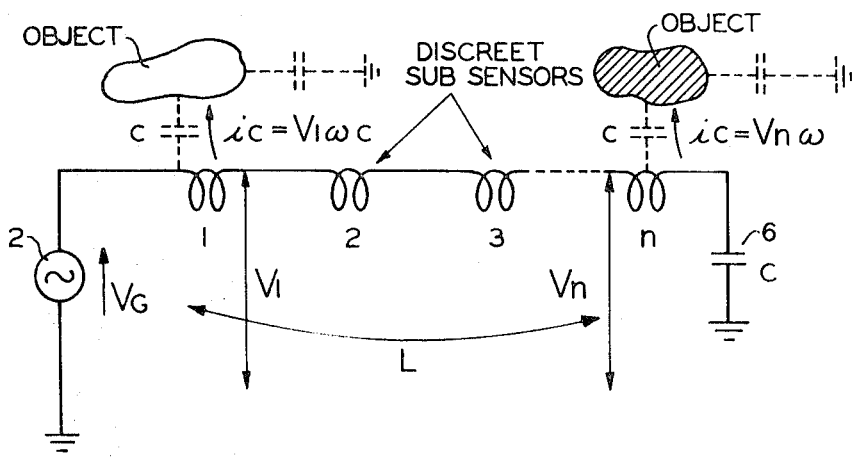
FIG. 6 is a schematic representation of the series connection of a plurality of sensor coils.

A plurality of coils can be obtained by dividing the inductive coil 4 into a predetermined number of coils connected in series. This configuration is shown in FIG. 6. The sensitivity of each of the subsensor coils drops in proportion to the number of subsensors. When the object whose motion is to be sensed introduces capacitive coupling to ground, the sensitivity of the individual subsensors will each be different. Referring to FIG. 6 the following voltage and current relationships exist:

$V_1 \approx V_g$
$V_n \approx V_G \times Q$
$V_n = V_1 \times Q$
$V_n >> V_1$
$i_{cn} >> i_{cl}$ To compensate for the nonequal sensitivity a unique arrangement of the coils is required. The ordinary series connection of the coils does not provide equal sensitivity because the sensors closer to the capacitance 6 will be more sensitive than the sensors closer to the source 2 which has low voltage and low impedance. Due to the nonequal potential along the series of coils the capacitive currents are different for different sensors and, therefore, the inductive-capacitive circuit will be detuned from resonance.

Figure 7:
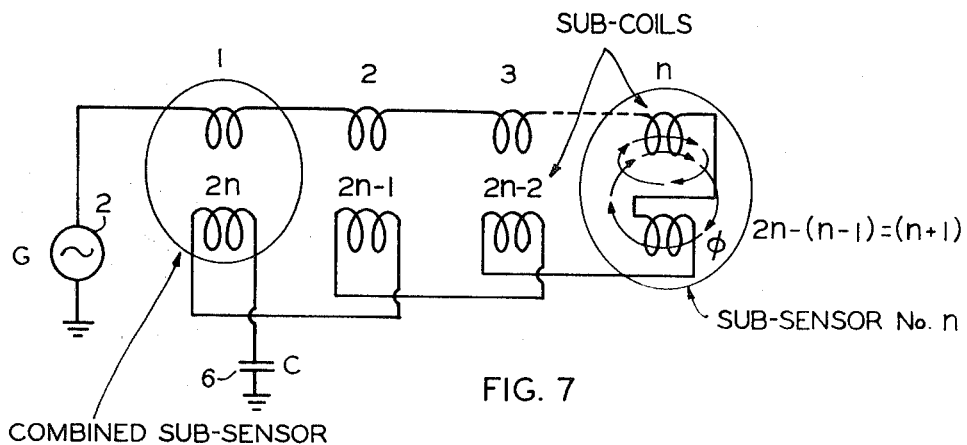
FIG. 7 is a schematic representation of the physical arrangement of the plurality of coils in the preferred embodiment.

To obtain equal sensitivity, the inductance 4 is divided into an even number $(2n)$ of subcoils as shown in FIG. 7. Subcoils 1 and $2n$ are combined to form the first subsensor. The magnetic flux of the two coils will be additive. Subcoils 2 and $2n-1$, 3 and $2n-2$, 4 and $2n-3$, ...$n$ and $2n-(n-1)$ are combined to provide $n$ number of subsensors of equal sensitivity. Each subsensor is a combination of two (or more) coils, one which is closer to the source of voltage 2 and the other which is closer to the capacitance 6. The average potential in each subsensor with respect to ground potential is constant and, therefore, the sensitivity is also constant. Regardless of which subsensor an object approaches the output signal variation of the subsensor will be equal.

Figure 8A:
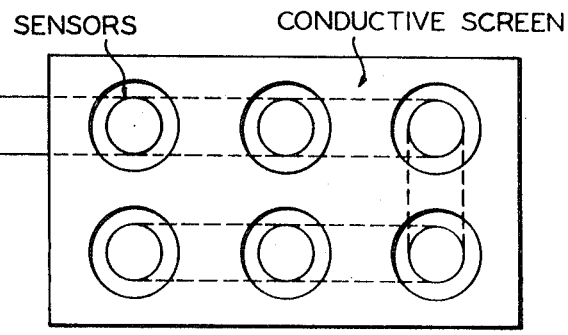
FIG. 8a is a diagrammatic illustration of the top view of the preferred embodiment mounted in a shielding sheet.
Figure 8B:
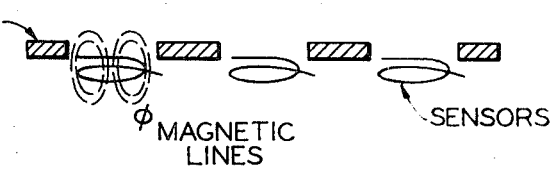
FIG. 8b is a diagrammatic illustration of the side view of the sheet shown in FIG. 8a; and, FIG. 9 is a block diagram representation of the constructed preferred embodiment of the invention.

Any electromagnetic disturbance which has a frequency component close to the resonance frequency of the inductance-capacitance circuit will produce an electrical signal similar to the signal produced by the specimen objects. To minimize such effects the subsensors are placed in the holes of a conductive sheet (see FIGS. 8a and 8b). This prevents the ambient electromagnetic field from entering the subsensors.

Figure 9:
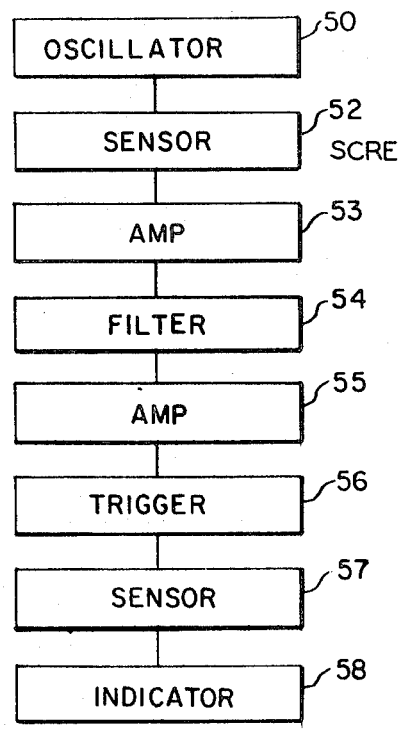

Referring now to FIG. 9 there is illustrated in block diagram form the preferred embodiment of the invention which was constructed to experimentally verify the characteristics of the system. A two-frequency oscillator 50 is electrically connected to the main sensing circuit 52 which was previously described. The two-frequency oscillator 50 permits a choice between a high resonant frequency and a relatively lower resonant frequency. In operation, one of the two frequencies would be chosen to provide the desired sensitivity. The high frequency will be more sensitive than the low frequency.

The main sensing circuit 52 is constructed to have the number of subsensors necessary to provide adequate coverage of the test area. The unique wiring of the sensors described previously is employed to permit substantially identical sensitivity of the subsensors.

The output from the main sensing circuit is amplified 53, filtered 54, and then amplified 55 again to provide a signal of magnitude sufficient to actuate the remainder of the system.

A trigger circuit 56 is utilized which will actuate a threshold sensing circuit 57 when the output signal reaches a predetermined level. The output of the main sensing circuit 52 is a signal which may be of varying duration. This time variation is created by the speed at which the specimen approaches the sensor. By the use of the trigger 56 and the multivibrator 57 circuits the variable duration of the signal from the amplifier 55 is converted to a uniform pulse of sufficient duration to actuate the indicating means 58.

The indicating means 58 may be a variety of devices including, for example, a counter or a printer. The duration of the pulse from the multivibrator 57 is determined by the requirements of the indicating means 58.

Although a certain and specific embodiment has been illustrated, it is to be understood that modifications may be made without departing from the true spirit and scope of the invention.

What is claimed is:

1. A proximity detection system for indicating the relative motion of animate objects comprising:

a plurality of inductive coil sensors in a series configuration, a base, means for evenly positioning and distributing said plurality of inductive coil sensors on said base to permit said animate objects to traverse the magnetic field of said inductive coil sensors.

an oscillator having an inductive/capacitance resonant circuit, means collectively connecting said inductive coil sensors to said oscillator as the inductive portion of said resonant circuit, a source of power electrically connected to and exciting said oscillator to produce an AC voltage across said coils, said voltage having a relative value that is directly related to Q value of said inductive coil sensors and the degree of inductive coupling between said coils and the Q value of said inductive coils with a nonideal dielectric object in the proximity of said coils, means for predetermining the Q value of said coils and the Q value of said coils when said objects are sensed, an amplification means having said voltage across said coils connected thereto, and an indication means having the output of said amplification means connected thereto indicative of said predetermined values representative of the presence of said animate objects.

2. A system as set forth in claim 1 wherein said amplifier output is a voltage signal of varying duration and wherein said system further includes a means to convert the amplified output of varying duration to a uniform pulse of predetermined duration, said conversion means connected between said amplification means and said indication means.

3. A system as set forth in claim 2 wherein said means to convert said varying duration voltage to a uniform pulse includes a trigger circuit and a multivibrator circuit.

4. A system as set forth in claim 1 wherein the induced voltages in the inductive coil sensors are proportional to the frequency of said oscillators and means to vary the resonant frequency of said circuit to control the sensitivity of said circuit to said nonideal dielectric objects in the proximity of said coils.

5. A system as set forth in claim 4 wherein said means to vary said resonant frequency decreases said resonant frequency to decrease said sensitivity below that of said nonideal dielectric objects in the proximity of said coils and means connected to said animate objects to increase the sensitivity thereof.

6. A system as set forth in claim 1 wherein said coils are wound as flat spiral coils and positioned coplanar with said supporting base to provide uniform sensitivity to nonideal dielectric objects traversing the perpendicular magnetic field of said coils.

7. A system as set forth in claim 1 wherein to equalize the sensitivity of said inductive coils said coils are wound in pairs with the last of said series and the first of said series, the second and the second from the last, the third and the third from the last, etc. wound together.

8. A system as set forth in claim 6 wherein said supporting base is an electrically conductive plate operative to minimize the electromagnetic disturbances having frequency components close to the resonance frequency of said inductance capacitance circuit of said oscillator.

9. A system as set forth in claim 8 wherein said electrically conductive plate further includes a plurality of cavities of a diameter greater than the diameter of said flat wound coils, and means individually positioning in separate cavities of said electrically conductive plate said wound coils.